Oct. 4, 1927.
W. H. GREEN
1,644,469
PROCESS AND APPARATUS FOR UTILIZING ZEOLITES
Filed June 8, 1923
2 Sheets-Sheet 2
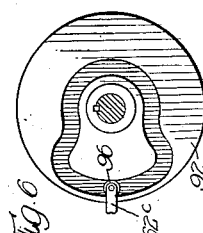
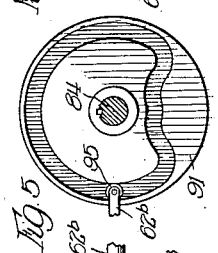
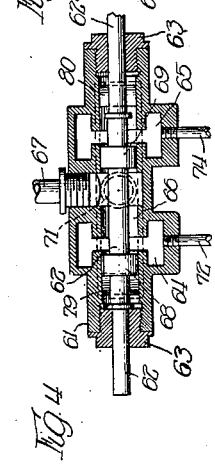
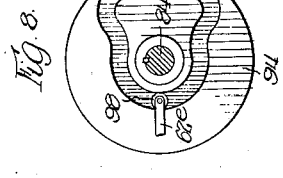
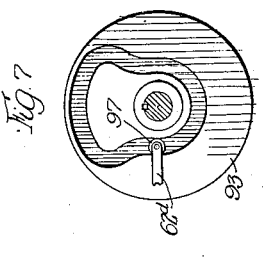
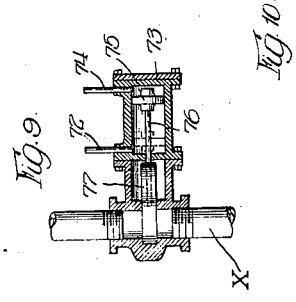
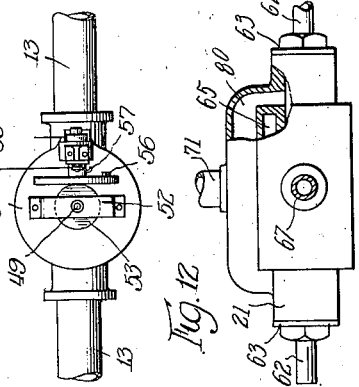
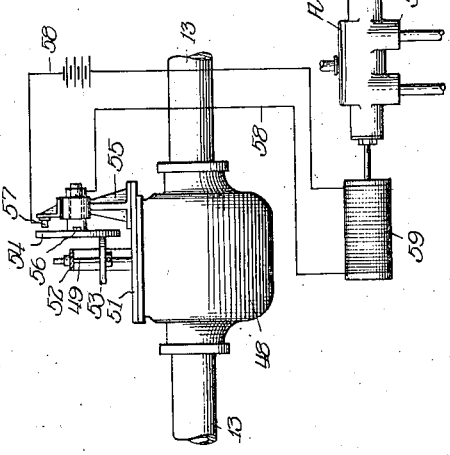
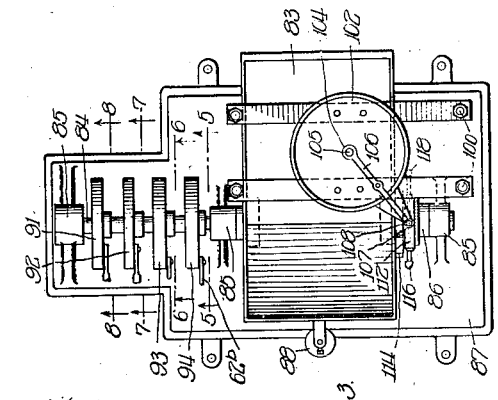
Witness:
R. Burkhardt
Inventor:
Walter H. Green,
By Cromwell Greist & Warden
Attys.

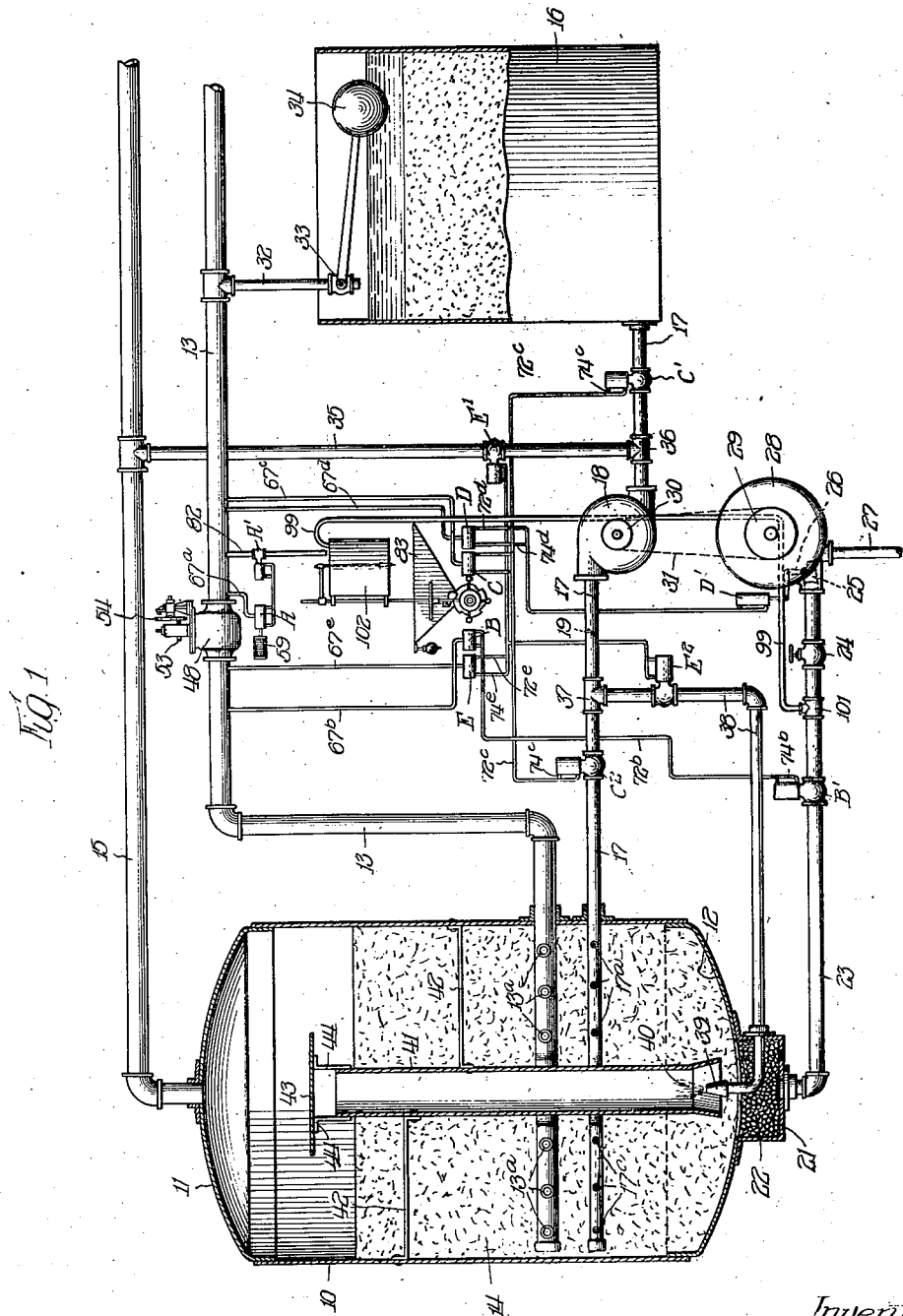

Patented Oct. 4, 1927.

1,644,469

UNITED STATES PATENT OFFICE.

WALTER H. GREEN, OF CHICAGO, ILLINOIS, ASSIGNOR, BY MESNE ASSIGNMENTS, TO GENERAL ZEOLITE COMPANY, OF CHICAGO, ILLINOIS, A CORPORATION OF ILLINOIS.

PROCESS AND APPARATUS FOR UTILIZING ZEOLITES.

Application filed June 8, 1923. Serial No. 644,085.

This invention has to do with the provision of a process and suitable apparatus for utilizing to the best advantage the base-exchanging properties of zeolites, and has particular reference to practices wherein the required contact between the liquid to be purified and the zeolites is effected by filtration or percolation.

The employment of zeolites has been advocated for the softening, demanganizing and deferrizing of water, for the purification of sugar juices and for other purposes, the literature on each subject disclosing the nature of the exchange, the composition of the particular zeolites involved and of the regenerating solution required. Having been most extensively employed for removing the constituents which cause hardness in water, the specification herein will be directed to that particular practice, although the invention may be utilized to advantage in the other fields, as the composition of the zeolites and the character of the regenerating solution will not alter in any material respect the procedure or the apparatus contemplated herein.

In the art of softening water by the use of zeolites it has been the customary practice to employ a bed of zeolites in a filter casing, to pass the water to be treated through zeolites containing sodium, upon exhaustion of the zeolites to cut off the flow of hard water and to saturate the zeolites with a regenerating solution of sodium chloride, then to wash out the brine, after which the softening operation may be resumed. In some cases an intermediate step of back-washing the zeolite bed to remove mechanically separated impurities is involved.

During the time required for reconditioning of the bed which, with certain kinds of commercial zeolites, requires four or more consecutive hours, and with others, shorter but much more frequent periods, the unit is out of operation so far as the delivery of softened water is concerned, wherefore it follows that regeneration of the zeolites must be effected during periods when there is likely to be no immediate demand for softened water. It frequently happens that these periods do not coincide with the necessity for regeneration so that uneconomical operation is the result. As a solution for the difficulties thus encountered large storage tanks for softened water have been advocated, but this requires a much larger investment and involves additional expense and room. In all cases the attendance of an operative is required to manipulate the apparatus for the accomplishment of the reconditioning steps, and on the whole the practice has been rather haphazard, unscientific and not altogether satisfactory.

The primary object of the present invention is to provide a process and suitable apparatus for effecting regeneration of the zeolites at intervals determined by their capacity for further softening action, without interfering with or interrupting the continuous supply of softened water from the unit.

A further object is to divide the bed into active and subjective portions; to retain in the active portion only zeolites having capacity for softening and to remove the same as they become exhausted to the remaining portion for subjection to a revivifying exchange with the base of a suitable regenerating solution.

A further object of the invention is to provide a process and apparatus for eliminating unproductive areas in the zeolite bed, which is accomplished by passing each particle of zeolite having capacity for softening water through the region of greatest softening exchange activity, and when it becomes exhausted removing it for regenerating treatment, after which it is again placed in the region where its restored powers may be utilized.

An additional object of the invention is to economize in investment and operation by carrying on simultaneously within a single casing the softening and delivery of hard water and the regeneration of the exhausted portions of the zeolite bed.

A still further object of the invention is to provide a method and means for determining the periods when regeneration is required, as well as for setting in operation the instrumentalities whereby such regeneration may be effected.

Still further objects and advantages of the invention will become apparent as the same is better understood from a study of the description of parts, and explanation of operation, of the preferred form of apparatus which is illustrated in the accompanying drawings. It will be understood, of course, that by illustrating and describing what I now consider to be the preferred embodiment of apparatus suitable for practicing the invention, I do not thereby suggest or intend that the invention is limited in its application, or that the solicited claims are to be narrowed in their interpretation to any details not specifically referred to therein, for it is reasonably expected that those skilled in the art will be able to take advantage of the principles involved in the disclosure by apparatus and methods of procedure perhaps dissimilar in appearance and arrangement but nevertheless within the scope of the invention as defined in the appended claims.

In Fig. 1 of the drawings I have shown a schematic arrangement of the preferred form of apparatus for carrying out the process involved.

Fig. 2 is a detailed view of the pot and tilting bucket which comprise a substantial part of the timing means for controlling the flow of brine and wash water employed for reconditioning and rearranging the zeolite bed.

Fig. 3 is a plan view of the pot and bucket and shows the mounting and arrangement of the cams for actuating certain of the pilot valves, Fig. 4 is a longitudinal sectional view through a pilot valve typical of the several herein employed.

Fig. 5 is a sectional view taken through the line of 5—5 of Fig. 3.

Fig. 6 is a section through the line 6—6 of Fig. 3.

Fig. 7 is a section through the line 7—7 of Fig. 3.

Fig. 8 is a sectional view through the line 8—8 of Fig. 3.

Fig. 9 is a longitudinal section showing in detail the construction of a typical hydraulic gate valve such as employed herein.

Fig. 10 is diagrammatic of the water meter control for initiating the reconditioning steps, and Fig. 11 is a plan view of the water meter arrangements shown in Fig. 10, and Fig. 12 is a plan view of the pilot valve shown in Fig. 4.

In the drawings—

The numeral 10 indicates a cylindrical casing provided with a cover 11 and a conical bottom 12. Water to be treated enters the casing through the hard water supply line 13 and the ports 13ª, passing through the upper portion of the bed of zeolites 14 and out through the treated water line 15 which leads to the place of use.

A brine tank 16 feeds a regenerating solution for revivifying exhausted zeolites through the brine supply line 17, which is provided within the casing with ports 17ª. A pump 18 is connected to the brine line, a check valve 19 being disposed in the line between the pump and casing, it being understood that the present embodiment is designed as a pressure system. The regenerating solution passes downwardly through the lower portion of the zeolite bed into the brine collector box 21, which is filled with coarse gravel 22, and leaves the casing through the brine discharge pipe 23.

A pressure regulating valve 24 is placed in the discharge pipe 23, the outer end of said pipe being provided with a pivotal nozzle 25 connected to bell crank lever 26. Numeral 27 represents a waste pipe into which the nozzle 25 may be directed to carry off the discharge from pipe 23, or the nozzle 25 may be directed, under the influence of the bell crank lever 26, to discharge against the blades of a Pelton wheel 28.

A pulley 29 on the wheel 28, is connected with pulley 30, on pump 18, by a belt 31, to operate the pump upon revolution of the Pelton wheel 28. A lead 32 from the hard water supply line 13, empties into the brine tank 16, the flow therethrough being controlled by wing valve 33 and the float 34.

After the lower portion of the zeolite bed has been reconditioned, and the flow of the brine has been discontinued, in the manner hereinafter to be explained, softened water from the casing is withdrawn from the line 15 for repassage through the casing via pipe 35, connection 36, brine supply line 17, pump 18, connection 37 and pipe 38. Pipe 38 terminates in a nozzle 39 which is directed to discharge a jet 40 of softened water upwardly into the flared lower end of an open ended, upstanding cylinder 41, which is suspended in the center of the zeolite bed by brackets 42 fastened to the inner wall of the casing 10.

The jet creates a current upwardly through the cylinder 41, which carries with it the regenerated zeolite particles adjacent the mouth of the cylinder. A baffle 43, supported above the upper end of the cylinder, by two or more brackets 44, deflects the current and induces the zeolite particles carried therein to settle back upon the top of the bed, where they are again in the region of softening activity for exposure to the upward flow of hard water entering through the ports 13ª.

The steps incident to reconditioning of the zeolite bed are initiated, operated and controlled in the following manner:

A water meter 48, having the conventional dial and indicator, is disposed in the raw water supply line 13. An extension 49, of the indicator shaft of said water meter, is projected vertically above the dial 51, a strap 52 forming a suitable bearing therefor. A horizontal disk 53 is splined to the shaft 49, the periphery of said disk being adapted to engage frictionally with the outer face of a vertical disk 54, the latter being journaled in the standard 55.

The inner face of disk 54 carries a contact point 56, which, upon each revolution of the said disk, engages the contact 57, thus closing the solenoid circuit 58. This energizes the solenoid 59 which is connected to, and, in turn, moves the piston of pilot valve A.

As in the present embodiment of my invention pilot valves are employed throughout, in connection with hydraulic gate valves, as the means for controlling such intermittent flows as are involved in the reconditioning of the zeolite bed, a statement of typical construction and operation will suffice, for which reference is made to Figs. 4 and 9.

The pilot valve comprises a substantially cylindrical casing 61, axially bored to permit reciprocation of double headed piston 62. The ends of the casing are sealed by screw caps 63. On either side of the transverse center are annular chambers 64—65 in open communication with the piston chamber 66. Water under pressure is received in the piston chamber through the inlet 67. The piston heads 68 and 69 are so spaced that movement of the piston to the limit in either direction will place them respectively on corresponding sides of the openings to chambers 64 and 65. At the rear of the casing 61, openings 79 and 80 from the ends of the piston chamber 66, lead to a waste pipe 71.

A tube 72 leads from chamber 64 (Fig. 4) to the inner end of hydraulic valve cylinder 73 (Fig. 9), a corresponding tube 74 connecting chamber 65 with the outer end of cylinder 73. A piston 75 has its rod 76 connected to a gate valve 77, the latter controlling the passage of water through the pipe X. In Fig. 9 the valve 77 is shown to be open, the dotted lines indicating the position of the piston and the valve when the latter is closed. The opening of valve 77 is effected in the following manner:

Movement of the piston 62 to the extreme left, as shown in Fig. 4, opens direct communication between inlet 67 and chamber 64, but cuts off direct communication with the chamber 65. Water under pressure, taken from hard water line 13, enters the piston chamber 66 through inlet 67, passing through chamber 64 and tube 72 into the inner end of cylinder 73, forcing the piston 75 (Fig. 9) to the right. Piston rod 76 being connected to valve 77 withdraws the valve, thus leaving a free passage through the pipe X.

Water in the cylinder 73 on the other or outer side of piston 75, is forced up through the tube 74, chamber 65, and out through opening 80 to the waste pipe 71. To close gate valve 77, the flow is merely reversed, piston 62 being moved to the right, opening a direct communication between inlet 67 and chamber 65, thus causing the water under pressure to pass through tube 74 to the outer end of cylinder 73, moving piston 75 and valve 77 to the position shown in dotted lines, this shutting off the passage of water through the pipe X. The exhaust water on the inner side of piston 75 is discharged through tube 72, chamber 64, opening 79 and waste pipe 71.

Having thus described a typical valve and its control, let us refer again particularly to the valve A. As the solenoid 59 is energized upon the completion of a revolution of the disk 54 in the manner already explained, the piston of valve A is moved, to cause water from the inlet 67$^a$, to pass through the appropriate chamber and tube of valve A to open hydraulic gate valve A$^1$, thus permitting water to flow from line 13 through pipe 82.

The frequency with which valve A$^1$ is opened depends upon the time taken for the disk 54 to make a complete revolution, which, in turn, is controlled by the amount of hard water passing through the water meter 48. By raising or lowering the disk 53 on the shaft 49, the speed of revolution of disk 54 can be accordingly increased or diminished, thus enabling a control of the operation of valve A$^1$ based upon the passage of any predetermined volume of water in the casing 10. If the water being treated contains more or less than the usual degree of hardness, the opening of valve A$^1$ may be timed accordingly by variation of the place of contact between disks 53 and 54.

The pipe 82 may empty directly into an open tilting bucket 83, mounted loosely on the shaft 84, by hubs 86 at the bottom of the bucket, or it may empty into the pot 102 which drains into bucket 83. The shaft 84 is journaled in standards 85 which rest upon a base 87.

The sides of the bucket 83 are triangular in shape, with the long leg normally at the front, the short leg at the rear, and the hypotenuse at the top. A counterweight 88 adjustably connected to the rear of the bucket, in conjunction with an adjustable support 89, serves to hold the bucket in upright position when empty.

Keyed to the shaft 84 in the relation shown in Figs. 5, 6, 7 and 8, are four cam wheels 91, 92, 93 and 94, each having a cam groove on its face, a portion of which groove is adjacent and there concentric with the periphery of the wheel. The outer portion of the groove in cam 91 extends over a segment constituting the first three-quarters of the wheel. In cam 92 the groove extends only over the first quarter, cam 93 over the second quarter and cam 94 over the third quarter.

A roller 95, traveling in the groove of cam 91, is connected to the piston 62$^b$ of pilot valve B. A roller 96, engaged in the groove of cam 92, is connected to piston 62$^c$ of pilot valve C. Roller 97, traveling in cam 93, is connected to piston 62$^d$ of valve D, and roller 98 of cam 94 to piston 62$^e$ of valve E.

The pilot valve B, through tubes 72$^b$ and 74$^b$, is connected with and operates the hydraulic valve B$^1$ in the brine discharge pipe 23. Pilot valve C, through tubes 72$^c$ and 74$^c$, operates hydraulic valve C$^1$, which is placed in the brine supply line 17 between the tank 16 and the pump 18, and also operates valves C$^2$ in the brine line between the pump and the casing 10. Pilot valve D, through tubes 72$^d$ and 74$^d$, operates the piston in cylinder D$^1$, which is connected to the bell crank lever 26. Pilot valve E, through tubes 72$^e$ and 74$^e$, operates the hydraulic valve E$^1$ in pipe 35 and the valve E$^2$ in pipe 38. The pressure supply for these four pilot valves are respectively inlets 67$^b$, 67$^c$, 67$^d$ and 67$^e$, all leading from pipe 13.

During the flow of regenerating solution and of wash water, a by-pass 99 leading from a reducing T 101 in the brine discharge 23, empties into the pot 102, the latter being supported by columns 100 standing upon the base 87. The pot 102 is positioned directly above the bucket 83, and has an orifice 103 in the bottom thereof into which a tapered plug 104 may be raised and lowered respectively to increase and decrease the effective size of the orifice. The plug is suspended from a vertically extending rigid arm 105, secured to a horizontal bracket 106, the latter being adjustably fastened to the vertical reciprocating rod 107 by a collar 108 and setscrew 109, the rod being slidably held in slotted arms 110 and 111, and its downward movement being limited by engagement of the collar 108 with the arm 110.

The rod 107 is provided with a horizontal bearing plate 112 at its lower extremity, the plate projecting into the plane of a lifter wheel 113, which wheel is keyed to the shaft 84 adjacent one side of the tilting bucket 83.

The wheel 113 is provided on its inner face with an annular ratchet edge 114, composed of four teeth. A pawl 115, which is secured to the side of the tilting bucket 83 adjacent the wheel 113, is adapted to engage the ratchet 114, and upon each forward tipping of the bucket, turns the wheel 113, the shaft 84 and each of the cams 91, 92, 93 and 94, one-quarter of a revolution. On the rim of the wheel 113, four adjustable radially projecting fingers 116, 117, 118 and 119, of different lengths, are provided. Upon revolution of the wheel these fingers are adapted successively to engage the lower face of the bearing plate 112, and correspondingly to raise or lower the rod 107, and thereby the plug 104, to vary accordingly the effective size of the orifice 103.

In the operation of the apparatus which has been described, hard water under pressure enters the casing 10 from inlet pipe 13, passing from the ports 13$^a$ through the upper portion of zeolite bed 14, leaving as softened water through the outlet pipe 15. After the softening capacity of that portion of the bed adjacent the inlet ports 13$^a$ has been exhausted, a regeneration of the exhausted portion is effected. This is initiated in the following manner:

The disk 53 on the water meter indicator shaft 49 is adjusted with relation to the disk 54, so that the passage of a predetermined volume of water, which will be indicated by the water meter, will cause one complete revolution of the disk 54, bringing into engagement, contact points 56 and 57. This closes the solenoid circuit 58, whereupon the solenoid 59 is energized to move the piston in pilot valve A, which, in turn, opens the valve A$^1$ in pipe 82. Water flowing through pipe 82 rapidly fills the bucket 83 which, because of its off-balance construction, tips forward and empties, and in so doing turns the wheel 113 one-quarter of a revolution through engagement of the pawl 115 with ratchet 114.

The wheel being keyed to the shaft 84, correspondingly revolves the latter, carrying through the first one-quarter revolution, each of the cams 91, 92, 93 and 94. Incidental to this change in position of the cams, the rollers 95 and 96 are brought into the outer portions of the grooves of cams 91 and 92, whereby a longitudinal movement is imparted through roller 95 to the piston 62$^b$ of pilot valve B, and through roller 96 to piston 62$^c$ of pilot valve C. This results in the opening of gate valves B$^1$, C$^1$, and C$^2$ in the manner that has already been explained in consideration of the typical operation of such valves.

Liquid at the bottom of casing 10 now flows through pipe 23, being directed by nozzle 25 against the blades of Pelton wheel 28, revolving the wheel and through pulleys 29 and 30 and belt 31, transmitting the power to operate the pump 18.

Valves C$^1$ and C$^2$ being open, brine from tank 16 is pumped through line 17 into the casing 10, passing out through pipe 23, a portion of the discharge being by-passed to the pot 102.

The initial turning of wheel 113 has brought into supporting position the finger 116. This being the shortest of the four fingers, the plug 104 is consequently in its lowermost operative position, and in cooperation with the orifice 103 permits a relatively slow escape of liquid from the pot 102 into the tilting bucket 83. The flow of brine will continue until such time as the bucket 83 is again filled, when in tipping, the bucket will cause the cam wheels to turn through the second quarter revolution, this retracting the piston 62$^c$ of pilot valve C to close gate valves C$^1$ and C$^2$, and imparting a thrust to the piston 62$^d$ in pilot valve D, which thrust being communicated to the piston in cylinder D$^1$, rocks the bell crank lever 26 to divert the nozzle 25 from the Pelton wheel to discharge directly into the waste pipe 27.

During the second period the valve B$^1$ remains open, so that a portion of the water undergoing treatment in the casing 10 flows through discharge pipe 23 to wash out the brine. The finger 117 is now supporting the plate 112 and being longer than finger 116, the tapered plug is raised higher, leaving a larger opening through orifice 103, in consequence of which the bucket 83 is filled in less time than was the case during regeneration.

The third tilting of the bucket reverses the piston 62d, thus redirecting the nozzle 25 to discharge against the blades of Pelton wheel 28, and it brings the outer or peripheral portion of the groove in cam wheel 94 into position, whereby the piston 62$^e$ of pilot valve E is actuated to open hydraulic valves E$^1$ in pipe 35, and E$^2$ in line 38, so that softened water from the pipe 15 will be pumped through the nozzle 39 upwardly into cylinder 41 to rearrange the zeolite bed, the regenerated portion being carried to the top of the bed and the exhausted portions dropping to the bottom for subsequent regeneration.

On the third turn the still longer finger 118 elevates the rod 107 to again increase the effective size of orifice 103, so that the time now taken to fill the tilting bucket is considerably shortened.

The fourth emptying of bucket 83 reverses the piston 62$^b$ in pilot valve B, and 62$^e$ in pilot valve E, thus closing valves B$^1$, E$^1$ and E$^2$ and marking the end of the reconditioning cycle.

The unit is now confined to the delivery of softened water, and will continue so to operate until the quantity of hard water, for which the bed is rated, has again passed through the water meter and brought about the closing of the solenoid circuit, which initiates a new regeneration.

On the fourth quarter turn of the wheel 113, the longest finger 119 is brought into engagement with the plate 112, leaving the effective opening of orifice 103 substantially equal to the diameter of pipe 82, in order that the time of operation incident to the first tilting of the bucket will be the same in case it is desired to discharge from pipe 82 into the pot 102, rather than directly into the tilting bucket 83.

During the reconditioning of the lower portion of the bed, the flow of hard water through the upper portion for softening, continues uninterruptedly. The capacity of the unit is not diminished during this period, nor is there any deterioration in the quality of the softened water delivered therefrom.

The bed may be reconditioned as frequently as is desired, and because of the wide latitude in adjustment permissible, the separate steps of the reconditioning may be varied in the time of their duration to fit the requirements of each individual installation.

I claim:

1. The process of softening water which comprises passing hard water continuously upwardly through a portion of a bed of zeolite, intermittently passing a regenerating solution downwardly through another portion of the bed, washing out the regenerating solution and then transferring particles of the bed from each of said portions to the other.

2. The process of utilizing zeolites which comprises disposing a bed of the same in a filter casing, passing a liquid to be purified continuously through a portion of the bed, intermittently passing a regenerating solution through the other portion of the bed, then washing the latter portion to remove the regenerating solution while in the same position and then rearranging the bed to transfer particles from the former portion into the latter portion and from the latter to the former.

3. The process of utilizing zeolites which comprises passing a liquid to be treated continuously through a portion of a bed of zeolites in one direction, intermittently passing a regenerating solution through the remaining portion in a different direction, then washing out the latter portion to remove the regenerating solution and then transferring particles from each portion to the other.

4. The process of utilizing zeolites which comprises passing a liquid to be treated continuously through a portion of a bed of zeolites in one direction, intermittently passing a regenerating solution through the remaining portion in another direction, then washing the latter portion to remove the regenerating solution, and then replacing exhausted particles in the former portion by regenerated particles from the latter portion and vice versa.

5. The process of utilizing zeolites which comprises passing a predetermined quantity of liquid to be treated continuously through a portion of a bed of zeolites, intermittently passing a regenerating solution through the remaining portion of the bed, then washing out the regenerating solution and then after each intermittent regeneration and subsequent washing transferring regenerated zeolites from the latter to the former portion of the bed.

6. The process of utilizing zeolites which comprises passing a predetermined quantity of liquid to be treated through a portion of a bed of zeolites, then passing a predetermined quantity of a regenerating solution through the remaining portion of the bed, then washing out the regenerating solution and then transferring regenerated zeolites from the latter to the former portion of the bed.

7. The process of utilizing zeolites which comprises passing a liquid to be treated through a portion of a bed of zeolites, passing a regenerating solution through the remaining portion of the bed at intervals determined by the passage of predetermined quantities of said liquid, washing out the regenerating solution and then transferring regenerated zeolites from the latter to the former portion of the bed.

8. Apparatus for utilizing zeolites comprising a casing, a bed of zeolites within the casing, means for passing a liquid to be treated through a portion of the bed, means operative upon the passage of a predetermined quantity of said liquid for passing a regenerating solution through the remaining portion of the bed, and means for washing out the regenerating solution.

9. Apparatus for utilizing zeolites comprising a casing, a bed of zeolites within the casing, means for passing a liquid to be treated through upper part of the bed, means operative upon the passage of a predetermined quantity of said liquid for passing a regenerating solution through the remaining portion of the bed, and means for washing out the regenerating solution.

10. Apparatus for utilizing zeolites comprising a casing, a bed of zeolites within the casing, means for passing a liquid to be treated through a portion of the bed, means for concurrently passing a regenerating solution through another portion, timing means for starting and stopping the flow of regenerating solution and means effective upon the stopping of flow of the regenerating solution for washing out the regenerating solution.

11. Apparatus for utilizing zeolites comprising a casing, a bed of zeolites within the casing, means for passing liquid to be treated through a portion of the bed, means for concurrently passing a regenerating solution through the remaining portion, timing means controlled by the flow of said liquid for starting and stopping the regenerating flow, and means for washing out the regenerating solution.

12. Apparatus for utilizing zeolites comprising a casing, a bed of zeolites within the casing, means for passing liquid to be treated through the bed, means controlled by the passage of said liquid for concurrently passing a regenerating solution through a portion of the bed, means controlled by the passage of the regenerating solution for cutting off the supply thereof, and means for washing the regenerating solution.

13. Apparatus for utilizing zeolites comprising a casing, a bed of zeolites within the casing, means for passing a liquid to be treated upwardly through a portion of the bed, means for passing a regenerating solution downwardly through the remainder of the bed, means for cutting off the supply of regenerating solution, and means actuated simultaneously with the cutting off of the supply of regenerating solution for washing out the regenerating solution.

14. Apparatus for softening water comprising a casing, a bed of zeolites within the casing, means for passing hard water through the upper portion of the bed, means for passing a regenerating solution through the remaining lower portion of the bed, means for cutting off the supply of regenerating solution and for washing out the lower portion of the bed, and means operative upon completion of the washing for removing zeolite particles from the lower to the upper portion and from the upper to the lower.

15. Apparatus for softening water comprising a casing, a bed of zeolites within the casing, means for passing hard water through the upper portion of the bed, means controlled by the passage of a predetermined quantity of hard water for passing a regenerating solution through the remaining lower portion of the bed, means for cutting off the supply of regenerating solution and for washing out the lower portion of the bed, and means for replacing exhausted zeolite particles in the upper portion of the bed with regenerated particles from the lower portion.

16. Apparatus for utilizing zeolites comprising a casing, a bed of zeolites within the casing, means for passing a liquid to be treated through the upper portion of the bed, means controlled by the passage of said liquid for passing a regenerating solution through the lower portion of the bed, means controlled by the passage of the regenerating solution for cutting off the supply of said solution and for washing out the lower portion of the bed, and means for removing zeolite particles from one portion to the other.

17. Apparatus for utilizing zeolites comprising a casing, a bed of zeolites within the casing, means for passing a liquid to be treated through the upper portion of the bed, means controlled by the passage of said liquid for passing a regenerating solution through the lower portion of the bed, means controlled by the passage of the regenerating solution for cutting off the supply of said solution and for washing out the lower portion of the bed, and means controlled by the passage of wash water for circulating the zeolite particles from one portion of the bed to the other.

18. Apparatus for utilizing zeolites comprising a casing, a bed of zeolites within the casing, means for passing a liquid to be treated through the bed and timing means for starting and stopping the flow of a regenerating solution through the bed, for starting and stopping a flow of wash water and for rearranging the bed after regeneration.

19. Apparatus for purifying water comprising a casing, a bed of zeolites within the casing, means for passing water through the casing and means controlled by the flow of water for starting through a portion of the bed, the concurrent passage of a regenerating solution, said means comprising a water meter, a solenoid connected to said meter and a valve actuated by said solenoid.

20. Water softening apparatus comprising a casing, a bed of zeolites within the casing, means for passing hard water through the casing, a by-pass, and timing means for regulating the flow of regenerating solution through the casing, said timing means comprising a tilting bucket adapted to be filled from said by-pass, a cam operated by said bucket, and a valve actuated by said cam.

21. Water softening apparatus comprising a casing, a bed of zeolites within the casing, means for passing hard water through the casing, means for intermittently starting a flow of a regenerating solution through the casing and timing means regulated by said flow for stopping the same, said timing means comprising a tilting bucket, a cam operated by said bucket and a valve actuated by said cam.

22. Apparatus for softening water comprising a casing, a bed of zeolites within the casing, means for passing hard water through the zeolites, means for intermittently starting a flow of a regenerating solution through said zeolites, a by-pass, and timing means for stopping said flow, said timing means comprising a tilting bucket adapted to be filled from said by-pass, a cam operated by said bucket and a valve actuated by said cam.

23. Apparatus for softening water comprising a casing, a bed of zeolites within the casing, means for passing hard water through the zeolites, means for intermittently starting a flow of a regenerating solution through said zeolites, a by-pass, and timing means for stopping said flow, and for starting and stopping a flow of wash water, said timing means comprising a tilting bucket adapted to be filled from said by-pass, a plurality of cams operated by said bucket and a plurality of valves actuated by said cams.

24. Water softening apparatus comprising a casing, a bed of zeolites within the casing, means for passing hard water through the zeolites, a by-pass, and timing means for regulating the flow of reconditioning liquids through the zeolites, said timing means comprising a tilting bucket, a pot adapted to receive liquids from said by-pass and to fill said bucket therewith through an orifice in the pot, a tapered plug within the orifice adapted upon movement to vary the effective opening of the orifice, a wheel having a plurality of radial fingers adapted upon revolution imparted by said tilting bucket to move the plug, a cam operated by said bucket and a valve actuated by said cam.

25. Apparatus for softening water comprising a closed casing, a bed of zeolites within the casing, means for passing hard water under pressure through said zeolites, and means for intermittently passing a regenerating solution through the casing, said means comprising a supply pipe for said solution, a water meter operated by the passage of the hard water, a solenoid connected to said meter, a valve adapted to be opened by said solenoid, a tilting bucket adapted to be filled by a flow of water through said valve, a cam operated by said bucket, hydraulic valves in said supply line actuated by said cam, a discharge pipe leading from the casing, a wheel adapted to be revolved by the liquid flowing through the discharge pipe and a pump in said supply line actuated by said wheel.

26. Water softening apparatus comprising a casing, a bed of zeolites within the casing, an open ended vertical cylinder disposed in said bed, means for passing hard water through the upper portion of the bed, means for intermittently passing a regenerating solution through the remainder of the bed, means for washing out the regenerating solution and a jet of soft water directed upwardly in the lower end of said cylinder for transferring zeolites from the bottom to the top portion of the bed upon completion of the washing operation.

27. Apparatus for utilizing zeolites comprising a casing, a bed of zeolites within the casing, means for passing through the casing a liquid to be purified by contact with the zeolites, means for initiating the concurrent flow of a solution through a portion of the bed capable of regenerating the zeolites, and timing means regulated by the said flow for stopping the same.

28. The process of utilizing zeolites which comprises continuously passing a liquid through a portion of a bed of zeolites to permit an exchange of bases between the liquid and the zeolites, intermittently passing through the remainder of the bed a solution capable of regenerating the zeolites, then removing the regenerated zeolites to another portion of the bed.

29. Apparatus for utilizing the exchange property of zeolites comprising a casing, a bed of zeolites within the casing, means for continuously passing a liquid to be altered by the exchange through a portion of the bed of zeolites, means for passing a solution capable of regenerating the zeolites through the remainder of the bed, and timing means for starting and stopping the passage of the regenerating solution.

30. Apparatus for utilizing the exchange properties of zeolites comprising a casing, a bed of zeolites within the casing, means for continuously passing through the bed a liquid to be altered by contact with the zeolites, and adjustable means controlled by the passage of said liquid for intermittently passing through the bed a solution capable of regenerating the zeolites.

31. Apparatus for utilizing the exchange properties of zeolites comprising a casing, a bed of zeolites within the casing, means for passing continuously through the bed a liquid subject to alteration by contact with the zeolites, and means controlled by the passage of predetermined quantities of said liquid for intermittently passing through the bed a solution capable of regenerating the zeolites and means for intermittently rearranging the bed.

32. Apparatus for utilizing the exchange properties of zeolites comprising a casing, a bed of zeolites within the casing, means for passing continuously through the bed a liquid subject to alteration by contact with the zeolites, means controlled by the passage of predetermined quantities of said liquid for intermittently passing through the bed a solution capable of regenerating the zeolites, and means controlled by the passages of predetermined quantities of the regenerating solution for cutting off the supply of said solution.

In testimony whereof I have hereunto subscribed my name.

WALTER H. GREEN.